Sept. 4, 1962

H. J. LAFAYE 3,052,017

VALVE INSERTING TOOL

Filed July 7, 1960

*INVENTOR.*
HILTON J. LAFAYE

BY

*J. B. Holden*
ATTORNEY ns patent office
3,052,017
Patented Sept. 4, 1962

3,052,017
VALVE INSERTING TOOL
Hilton J. Lafaye, Akron, Ohio, assignor to The Goodyear Tire & Rubber Company, Akron, Ohio, a corporation of Ohio
Filed July 7, 1960, Ser. No. 41,281
2 Claims. (Cl. 29—221.5)

The invention relates to a tool for use in mounting a tire and tube on a rim and, more particularly, to a tool to direct the tube valve stem through the valve hole in the rim during the mounting.

Although tubeless tires are being used extensively, many tire and tube assemblies are still being used. This is particularly true in truck sizes and the mounting and dismounting presents many problems if they are to be done efficiently. Many special tools and gadgets are available to perform some of the various steps in the operations. In mounting larger tires, such as a truck tire and tube on multi-part rims, one problem that is encountered is the insertion of the valve stem of the tube through the valve hole in the rim base. Some rim bases have a valve slot which causes no particular problem but the trend has been to eliminate the use of the slot. Water, dirt and other foreign material accumulates in the slot and eventually will cause corrosion of the rim and abrasion of the tube and flap to cause deflation. Consequently, a hole slightly larger than the valve stem is formed in the rim base through which the valve stem is inserted thus for practical purposes preventing any entry of any matter to substantially reduce the effects of corrosion and abrasion.

Since the majority of the truck tire tube valve stems are not straight but bent, the usual techniques or tricks used by the trade to insert the stem through the hole are not satisfactory. This is particularly true where a great quantity of tires and tubes are mounted such for example on a vehicle assembly line or in a large tire repairing and maintenance shop. The tool of this invention is a simple device to automatically guide the valve stem through the valve hole in the rim base with practically no effort on the part of the operator as the tire drops into position thereover. It is, therefore, an object of this invention to provide a new and novel valve inserting tool for use in mounting a tire and tube on a rim.

Another object of the invention is to provide a simple, efficient and inexpensive tool.

A further object of the invention is to provide a valve inserting tool that minimizes the work of the operator to attain positive results when inserting the valve stem into the valve hole of the rim base during the mounting of a tire and tube.

Other objects and advantages of this invention will become apparent hereinafter as the description thereof proceeds, the novel features, arrangements and combinations being clearly pointed out in the specification as well as the claims thereunto appended.

Figure 1:
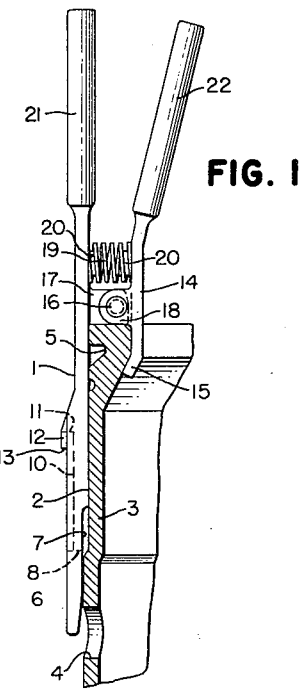
Figure 2:
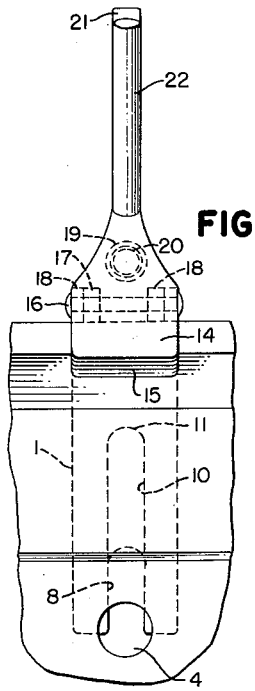
Figure 3:
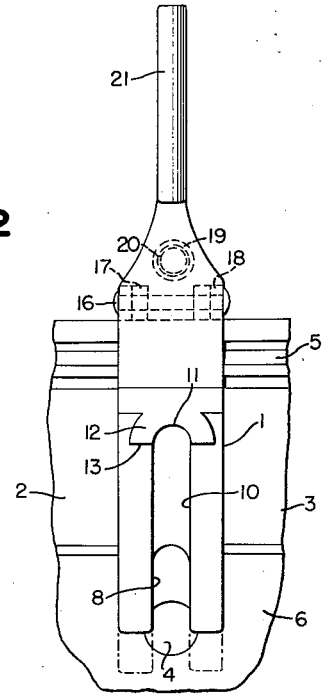
Figure 4:
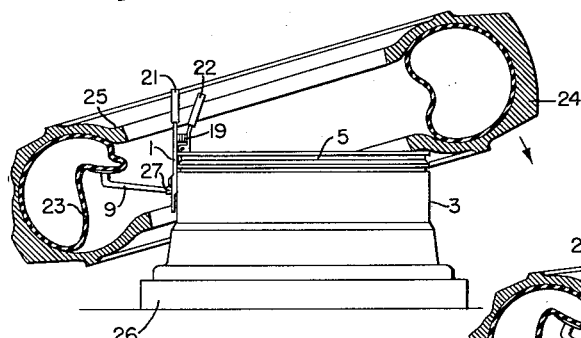
Figure 5:
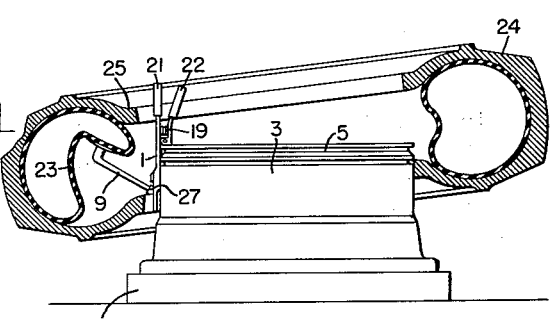
Figure 6:
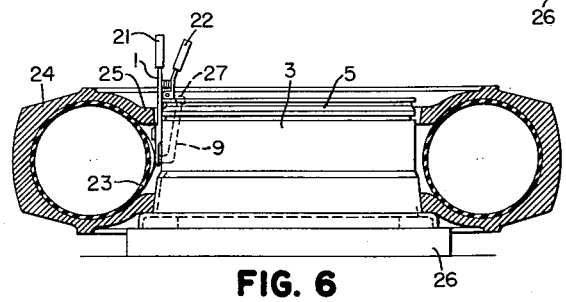

In the drawings:
FIG. 1 is a side elevation of the tool in position on a typical rim base;
FIG. 2 is a bottom plan view of the invention;
FIG. 3 is a top plan view of this invention; and
FIGS. 4, 5 and 6 illustrate a series of typical positions of the tire, tube and rim during the mounting operation.

The tool, as seen in FIGS. 1, 2 and 3, includes a guide bar 1 adapted to lie on the tire mounting surface 2 of the rim base 3 having valve hole 4 extending therethrough. The guide bar 1 preferably is of sufficient length to extend to at least the center line of the valve posi- tioned the greatest distance from the edge of the rim base 3 in the range of rim sizes with which the tool is to be used. The dotted lines in FIG. 3 illustrate the position of the guide bar when it would extend beyond the required center line of the valve hole. As shown, the rim base 3 includes a gutter 5 along the edge, the top of the gutter 5 being flush with the adjacent portion of the base 3 which is of a slightly smaller diameter than the center portion 6 of the rim base 3. This particular rim section is well known and widely used and the critical dimensions of the rim conform to the standards of the Tire and Rim Association. Preferably the under-side of the inner portion of the guide bar 1 is recessed as at 7 so that the guide bar 1 will firmly seat on the base 3 when the tool is being used.

As best seen in FIG. 3, a slot 8 is positioned centrally in the end of the guide bar 1 and extends longitudinally thereof for a distance so as to be usable on rims having the valve hole 4 in different locations. The slot 8 is of a width to permit the valve stem 9 to easily pass along during mounting as will be described later. As an extension or projection of the slot 8, a channel 10 of substantially the same width as the slot is formed in the guide bar 1 and terminates when the tool is positioned on the rim base, inwardly from the gutter 5 and under the bead area of a mounted tire. As shown, the depth of the channel 10 is substantially one-half the thickness of the inner portion of the guide bar 1 and at the outer end 11 of the channel 10, a raised portion 12 on the upper side forms a substantial shoulder 13, the purpose of which will become apparent subsequently.

In order to firmly hold the guide bar 1 in position on the rim base 3, a clamping member 14 has end 15 extending angularly upward so as to conform substantially to the contour of the inner surface of the gutter edge 5. The clamping member 14 is pivotally attached to the guide bar 1 by pin 16 passing through lugs 17 and 18 of guide bar 1 and clamping member 14 respectively. A compression spring 19 positioned between guide bar 1 and clamping member 14 is held in position by bosses 20 extending into each open end of the spring 19. When the tool is in position on the rim, the spring 19 is compressed and firmly urges the clamping member 14 toward the guide bar 1 to tightly grip the gutter edge of the rim. For convenience of manipulation by the operator, handles 21 and 22 are formed on the end of guide bar 1 and clamping member 14 respectively. As shown, handle 22 extends angularly away from handle 21 on guide bar 1 in the clamping position so as to provide sufficient movement and leverage for the operator to open easily the clamping members to apply the tool to the rim.

In using the tool of the invention to mount tire and tube on a rim as seen in FIGS. 4, 5 and 6, the tube 23 is placed inside the tire casing 24 and partially inflated in the usual manner. The valve stem 9 in this position extends axially toward one of the sidewalls of the tire 24 and lies radially inwardly of the tire bead 25. The rim base 3 with the gutter edge portion facing upwardly is placed preferably upon a support 26 so that the tire can fall freely into position with the lower bead moving onto the bead seat of the rim base. The tool then is positioned on the rim base 3 with the slot 8 centrally positioned over the valve hole in the rim base, as seen in FIGS. 2 and 3. The tire and tube assembly is then placed into position with the valve stem pointing upwardly and aligned with valve slot 8 and a portion of the lower tire bead resting on top of the rim base diametrically opposite the valve hole position. The diametrically opposite portion of the same bead lies below the top edge of the rim base at the valve hole location. This initial position of the tire and tube is substantially as shown in FIG. 4. The operator then pushes the valve stem 9 down as shown in FIG. 4 to engage the end 27 of the valve stem against the shoulder 13 at the end of channel 10 as seen in FIG. 4. The operator then lifts the portion of the tire adjacent the tool upwardly and simultaneously inwardly toward the rim base to maintain the end of the valve stem 27 in engagement with the shoulder 13 and simultaneously permit the bead portion opposite the valve hole to drop over the rim base. As this occurs, the entire tire and tube assembly drops into position on the rim base and simultaneously end 27 of valve stem 9 moves away from the shoulder 13 to slide down the channel 10 into the slot 8. As it reaches the valve hole 4 in the rim base, the valve stem pops through hole 4. The operator then removes the tool and pulls the valve stem to finally seat and position it therein. The bead seat ring (not shown) and lock ring (not shown) then are placed in position on the gutter edge of the rim in accordance with the usual practices.

It is apparent that the channel and slot in the end of the guide bar 1 of the tool provides a way over which the valve stem moves to automatically guide the valve stem into the valve hole with no effort on the part of the operator once he has positioned the end of the valve stem against the shoulder 13 of the tool.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A device for guiding a valve stem of an innertube through a valve hole in a gutter edge rim base when mounting a tire and tube thereon, said device comprising an elongated guide bar adapted to lie on the tire mounting side of said rim base normal to the gutter edge thereof and extending at least to the center of the valve hole, a slot in one end of said guide bar extending in a lengthwise direction for at least a distance sufficient to expose the valve hole when said guide bar is positioned on the rim base, an elongated channel extending from said slot toward the other end of said guide bar and terminating inwardly of the gutter edge of said rim base when positioned thereon, an abutment across the terminating end of the channel to engage the end of and initially position the valve stem for the subsequent mounting of the tire and tube and clamping means on the second end to engage the gutter edge of said rim base to retain said guide bar in position thereon during the mounting operation, the channel and slot forming a way down which the valve stem slides to be guided thereby to pass through the valve hole in the rim base as the tire and tube drop into position on the rim base.

2. A device for guiding a valve stem of an innertube through a valve hole in a gutter edge rim base when mounting a tire and tube thereon, said device comprising an elongated guide bar adapted to lie on the tire mounting side of said rim base normal to the gutter edge thereof and extending at least to the center of the valve hole, a slot in one end of said guide bar extending in a lengthwise direction thereof for at least a distance sufficient to expose the valve hole when said guide bar is positioned on the rim base, an elongated channel extending from said slot toward the other end of said guide bar terminating inwardly of the gutter edge of said rim base when positioned thereon, an abutment across the terminating end of the channel to engage the end of and initially position the valve stem for the subsequent mounting of the tire and tube and clamping means on the second end to engage the gutter edge of said rim base to retain said guide bar in position thereon during the mounting operation, the channel and slot being of a substantially uniform width slightly greater than the diameter of said valve stem and forming a way down which the valve stem slides to be guided to pass through the valve hole in the rim base as the tire and tube drop into position on the rim base.

References Cited in the file of this patent

UNITED STATES PATENTS

| | | |
|---|---|---|
| 839,176 | Morriss | Dec. 25, 1906 |
| 2,333,564 | Hargrave | Nov. 2, 1943 |
| 2,913,743 | Bingham | Nov. 24, 1959 |